Sept. 22, 1959 L. D. ORSER 2,905,355
COMPRESSIBLE STOPPER
Filed July 17, 1956
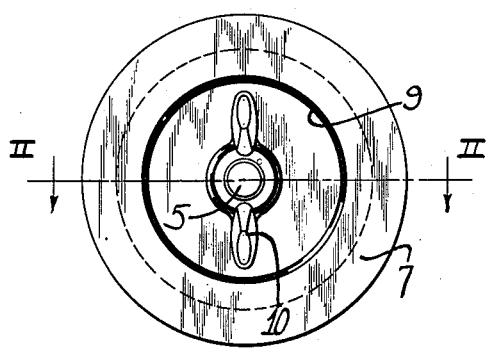
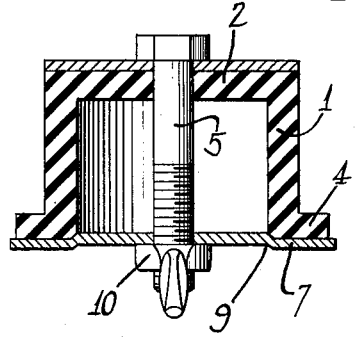
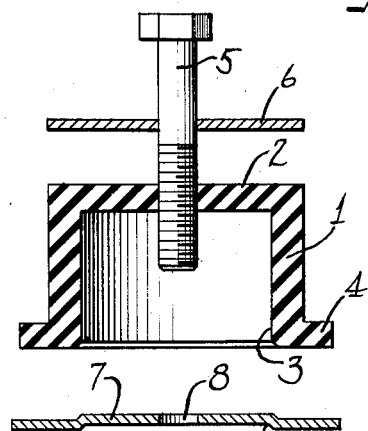
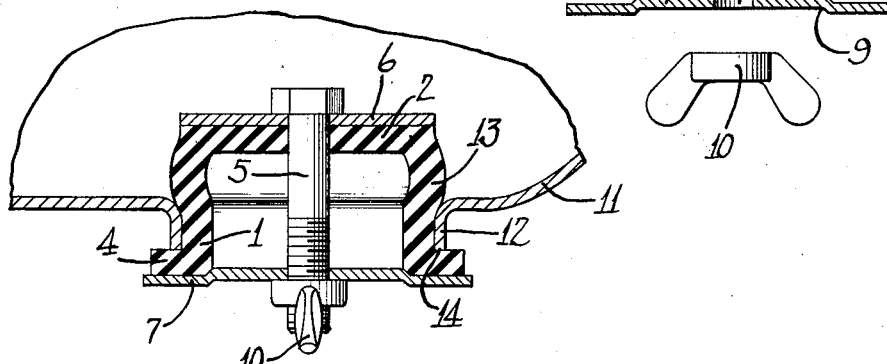
Inventor
Lawrence D. Orser United States Patent Office 2,905,355
Patented Sept. 22, 1959

2,905,355

COMPRESSIBLE STOPPER

Lawrence D. Orser, Cedar Falls, Iowa, assignor to Chamberlain Corporation, Waterloo, Iowa, a corporation of Iowa Application July 17, 1956, Serial No. 598,421

1 Claim. (Cl. 220—24.5)

This invention relates to improvements in a compressible stopper, and more particularly to a stopper for sealingly closing and opening in a vessel, a stopper being designed to effect a seal that will withstand relatively high liquid or fluid pressure, and the invention being highly desirable for use as a drain hole stopper in a tank or the like, although the invention will have other uses and purposes as will be apparent to one skilled in the art.

In the past, many various types of compressible stoppers have been developed, but in all instances of which I am aware, these stoppers were most frequently used in openings defined by cylindrical necks and the like, wherein almost the entire length of the stopper was contiguous with a vessel wall defining the opening. Consequently, these formerly known stoppers effected a seal adjacent the walls defining the opening, but did not effect a seal against the wall of the vessel extraneous of the opening, or in other words, did not effect a double seal. Furthermore, stoppers of this character known in the past were not as quickly operable as desired, and frequently since they only effect an annular seal at one location within an opening, required an objectionable amount of force in order to effect that particular seal. In many other cases, stoppers heretofore known were equipped with cams and lever arms in order to expedite actuation thereof, but in such event the sealing effect of the stopper was limited by the size of the cam and a predetermined amount of sealing effect could not be obtained. Moreover, stoppers of such construction were objectionably expensive and sometimes so costly in construction as to prohibit their use.

With the foregoing in mind, it is an important object of the instant invention to provide a stopper that may be very facilely operated to either establish or effect a release of the seal and the actuation may readily be accomplished by the hand of the user without an objectionable amount of force being utilized.

Another object of the invention is the provision of a stopper so constructed that it not only effects a seal within an opening or port, but also effects another seal around the opening or port so that there is a positive sealing engagement wherever the stopper comes in contact with the port wall or vessel wall adjacent the port.

It is also a feature of this invention to provide a compressible stopper of the character set forth herein which may readily be inserted in either direction through a port and as quickly adjusted into sealing engagement.

A further object of this invention is the provision of a stopper embodying a body part in cup-shape having a closed end and an open end with a lateral flange extending around the open end, and means associated with said body part to compress the same and cause lateral expansion thereof.

It is also a feature of this invention to provide a quick acting sealing stopper comprising a cup-shaped body part of resilient material with a rigid plate disposed over both the open and the closed ends of said body part, and with means for drawing the plates together so as to compress the body part and cause lateral expansion thereof.

Still another object of the instant invention is the provision of a quick acting sealing stopper comprising a cup-like element of resilient material having a bolt aperture in the closed end thereof, and also having an integral lateral flange around the open end thereof, there being a rigid plate disposed over each end of the body part, with a bolt extending through both plates and the body part with a wing nut engaged with the projecting end of the bolt.

Still a further feature of the invention is the provision of a hollow substantially cylindrical stopper of resilient material, with compression means extending through the stopper, the compression means being of considerably less diameter than the inside diameter of the stopper itself, so that great lateral expansion of the stopper is occasioned with the use of little force on the compression means.

While some of the more salient features, characteristics and advantages of the instant invention have been above pointed out, others will become apparent from the following disclosures, taken in conjunction with the accompanying drawing, in which:

Figure 1 is an end view of a compressible stopper embodying principles of the instant invention;

Figure 2 is a central vertical sectional view taken substantially as indicated by the line II—II of Figure 1, looking in the direction of the arrows, and with parts shown in elevation;

Figure 3 is an exploded view, with parts shown in central vertical section, illustrating all parts of the instant invention prior to assembly; and Figure 4 is a fragmentary central sectional view, with parts in elevation, showing the stopper operatively associated with a vessel in the nature of a tank or the like.

As shown on the drawings:

In the illustrated embodiment of the instant invention, with particular reference to Figure 3, there is shown a stopper comprising a body portion 1 which is substantially cylindrical and generally cup-shaped. This body portion is made of resilient material such as rubber, synthetic rubber, or the equivalent, and is provided with a closed end as indicated at 2 and an open end 3. Around the open end 3 is a laterally extending flange 4 integral with the body part. It is a simple expedient to mold the entire body part in one piece. Preferably centrally thereof, the closed end 2 of the body part is provided with a relatively small aperture to accommodate compression means which, in the illustrated showing is in the form of a headed bolt 5. The bolt 5 also extends through a rigid plate 6, preferably made of metal, and in the finished construction the head of the bolt 5 is brought against the plate 6 and brazed or equivalently secured thereto in a permanent manner. It will be noted from the showing in Figure 2, that the bolt is of considerably less diameter than the inside of the body 2.

Another metallic plate 7 also apertured as at 8 to accommodate the bolt 5 is disposed over the open end and the flange 4 of the body part 2. This plate preferably is centrally recessed as indicated at 9 to extend a short distance within the body part while the outer margin of the plate intimately and flatly overlies the flange 4. A wing nut 10 engages the projecting end of the bolt outside the plate 7.

When the stopper is assembled, it will have a normal condition or shape as seen in Figure 2. This is prior to the application of compression of the body part by virtue of tightening the wing nut and thus drawing the plates 6 and 7 toward each other.

In operation, the instant invention is exceedingly simple to manipulate, and so positive in its action as to be capable of withstanding considerable pressure. With the stopper assembled as in Figure 2, it may be inserted through a port in a vessel and tightened down to effect a seal. In the present instance, with reference to Figure 4, I have illustrated the stopper shown with the drain port in a spraying tank wherefrom liquid is sprayed under pressure built up within the tank. Such spray tanks frequently have pressures exceeding 200 pounds per square inch, and consequently a positive stopper over the drain opening is essential. In this instance, the tank 11 is provided with a drain opening defined by an outwardly turned margin or neck 12 terminating in an abrupt circumscribing edge. The stopper may be inserted in the opening through the margin 12 until the inside face of the flange bears against the abrupt edge of the margin 12, as seen in Figure 4. Then, the wing nut 10 may be tightened on the bolt 5 drawing the plates 6 and 7 towards each other and compressing the hollow body portion of the stopper. This compression results in an expansion of the stopper inside the opening as indicated at 13 which effects a positive and unbreakable seal. At the same time, a positive seal is established as indicated at 14 around the abrupt edge of the margin defining the drain port. Thus, there is a seal around the edge of the margin, tight contact all over the inside surface of the margin, and an effective seal inside the opening by virtue of the expansion at 13. Not only is there in effect a double seal, but a continuous or multiple seal throughout all portions of the drain port. Also, compression of the stopper causes an inward pressure of the closed end 2 around the bolt 5 so that there is no danger of leakage between the closed end 2 and the plate 6. Also, it will be especially noted that only a normal amount of pressure on the wing nut 10 is required, a pressure that is not objectionable for manipulation by the hand of a user. It will further be noted that the stopper may be inserted in the opposite direction through the drain port, if so desired, and in that instance, the flange 4 would effect the seal around the opening inside the tank 11, and the swelling of the stopper as at 13 due to compression of the body part thereof would effect another tight seal around the abrupt edge of the marginal portion defining the port.

From the foregoing it is apparent that I have provided a simple form of compressible stopper, evenly manipulated, and which is so constructed as to be instantly highly effective in withstanding considerable pressures.

It will be understood that modifications and variations may be effected without departing from the spirit and scope of the novel concepts of the present invention.

I claim as my invention:

In combination, a container of relatively thin rigid material having an opening in a wall thereof defined by a relatively short outwardly projecting neck terminating in an abrupt edge, a stopper removably inserted in said opening for effecting a liquid tight closure and including a generally cup-shaped body provided with a generally cylindrical wall of an outside diameter substantially the same as the inner diameter of said neck and being at least twice as long as the neck, said cylindrical wall having at one end a closure wall centrally apertured and at the opposite end a laterally projecting annular flange which is substantially wider than the thickness of said neck and is engaged with the edge of the neck and with the cylindrical wall projecting into the container beyond the inner end of said neck, a rigid plate of about the same diameter as the outside diameter of said cylindrical wall lying against the outside face of the end closure wall, a rigid plate of a diameter to overlie said lateral flange and bearing thereagainst and having an offset central portion of substantially the same diameter as the inner diameter of the cylindrical wall where it opens past said flange, said offset portion extending into the open end of said cylindrical wall and in contact therewith resisting inward deflection of the flange, and bolt and nut means extending centrally through said plates and the aperture in said end wall and operating by tightening of the nut on the bolt to draw said plates toward one another and thereby bulge the cylindrical wall inside the container into lateral sealing relation at the inner end of said neck while at the same time clamping said flange against said edge of the neck to thereby effect a seal against escape of liquid from the container.

References Cited in the file of this patent

UNITED STATES PATENTS

| 1,495,000 | Cuthbertson | May 20, 1924 |
| 2,760,667 | Moeller | Aug. 28, 1956 |
| 2,782,958 | Hurley | Feb. 26, 1957 |

FOREIGN PATENTS

| 736 | Italy | Aug. 17, 1882 |